United States Patent
Shinmura et al.

(10) Patent No.: US 6,891,367 B2
(45) Date of Patent: May 10, 2005

(54) MAGNETIC SENSOR INCLUDING A PLURALITY OF STAGGERRED OVERLAPPING ROWS OF MAGNETORESISTIVE ELEMENTS

(75) Inventors: Koji Shinmura, Kanazawa (JP); Tamotsu Minamitani, Mattou (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/256,069

(22) Filed: Sep. 27, 2002

(65) Prior Publication Data

US 2003/0067299 A1 Apr. 10, 2003

(30) Foreign Application Priority Data

Sep. 28, 2001 (JP) ........................................ 2001-301096

(51) Int. Cl.⁷ .............................................. G01R 33/02
(52) U.S. Cl. .................... 324/252; 324/207.21
(58) Field of Search ................................ 324/252, 260, 324/262, 207.21; 338/32 R

(56) References Cited

U.S. PATENT DOCUMENTS

| | | | | |
|---|---|---|---|---|
| 4,806,860 A | * | 2/1989 | Iijima et al. | 324/207.21 |
| 5,038,131 A | * | 8/1991 | Olk et al. | 338/32 R |
| 5,821,517 A | * | 10/1998 | Fedeli et al. | 235/449 |
| 6,201,466 B1 | * | 3/2001 | Schroeder | 338/32 R |
| 6,690,159 B2 | * | 2/2004 | Burreson et al. | 324/207.23 |

FOREIGN PATENT DOCUMENTS

| | | |
|---|---|---|
| JP | 52-106752 | 9/1977 |
| JP | 05-332703 | 12/1993 |
| JP | 6-43254 | 2/1994 |
| JP | 8-261706 | 10/1996 |
| JP | 11-153637 | 6/1999 |

* cited by examiner

*Primary Examiner*—N. Le
*Assistant Examiner*—Reena Aurora
(74) *Attorney, Agent, or Firm*—Keating & Bennett, LLP

(57) ABSTRACT

A magnetic sensor includes a plurality of rows of elements in each of which a plurality of magnetoresistive elements are aligned in a direction which intersects at a predetermined angle the passing direction of an object to be detected, the object including magnetic patterns, the plurality of rows of elements being staggered in the passing direction of the object to be detected. Each of the magnetoresistive elements includes a magnetic sensitive region, and each of the magnetoresistive elements in one of the rows of elements is aligned so that the magnetic sensitive region overlaps the magnetic sensitive region of the magnetoresistive element in another row in the passing direction of the object to be detected. Accordingly, the whole region passed by the object in the alignment direction of the magnetoresistive elements is a magnetic sensitive region.

18 Claims, 6 Drawing Sheets

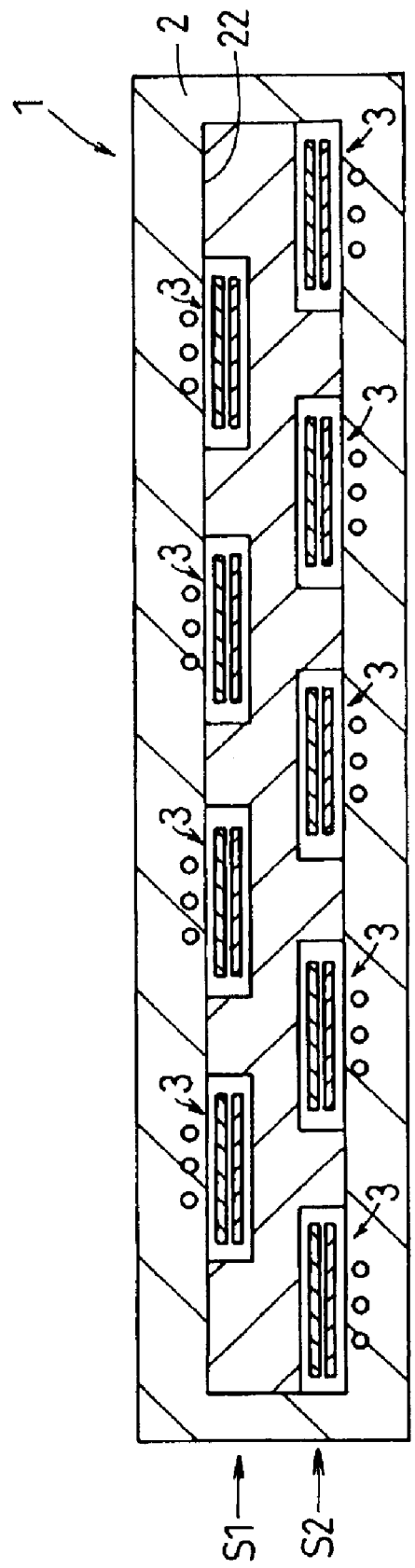

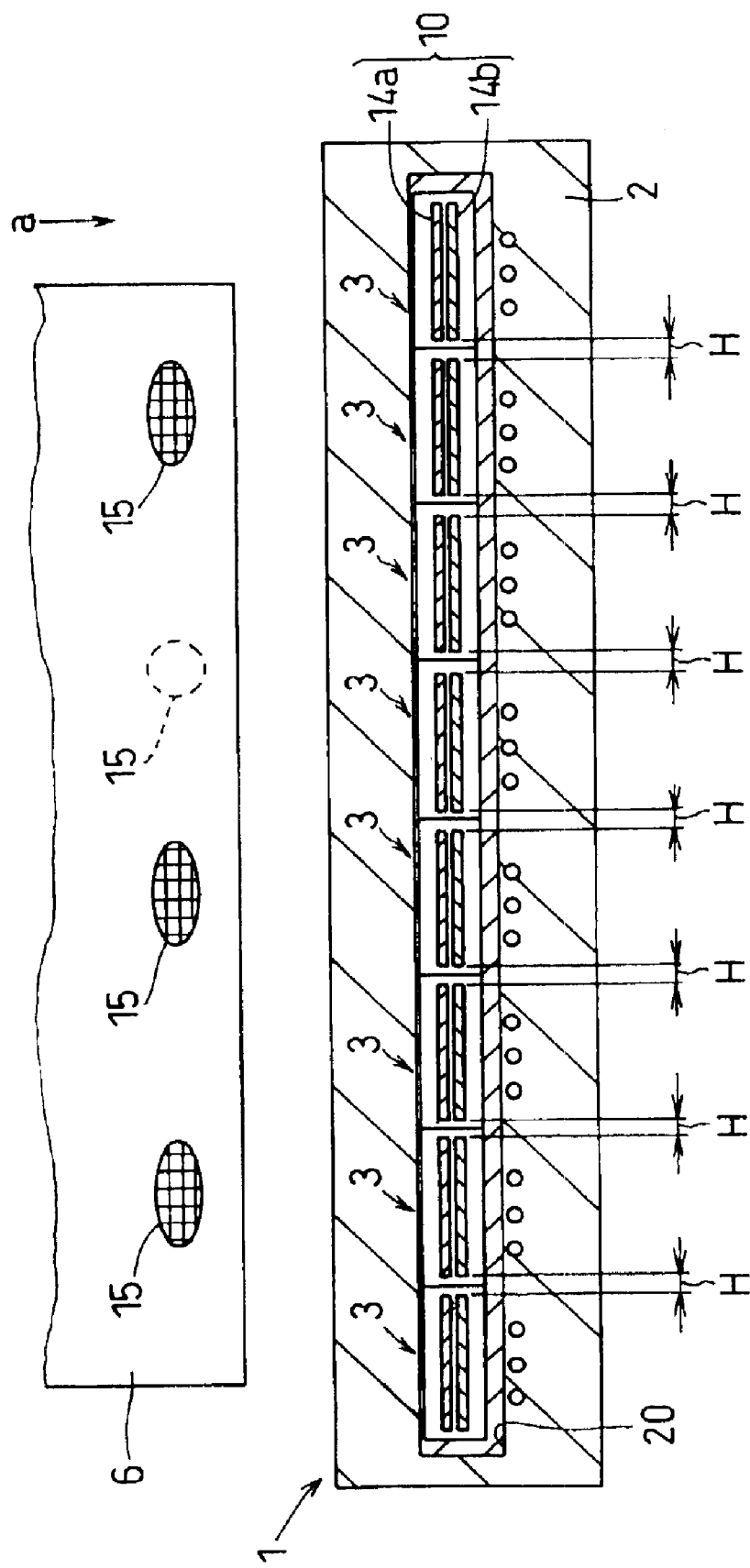

MAGNETIC SENSOR INCLUDING A PLURALITY OF STAGGERRED OVERLAPPING ROWS OF MAGNETORESISTIVE ELEMENTS

BACKGROUND OF THE INVENTION

1. Field of the Invention

The present invention relates to magnetic sensors. More specifically, the present invention relates to a magnetic sensor in which a plurality of magnetoresistive elements are aligned in a direction which intersects the passing direction of an object to be magnetically detected at a predetermined angle, for example, at a right angle.

2. Description of the Related Art

Referring to FIG. 7, a magnetic sensor 1 and a magnetic card 6 to be detected by the magnetic sensor 1 will be described.

In FIG. 7, the magnetic card 6 includes a plurality of magnetic patterns 15, which are aligned in the longitudinal direction of the detecting surface of the magnetic sensor 1. The magnetic patterns 15 correspond to data recorded in the magnetic card 6.

The magnetic sensor 1 includes a plurality of magnetoresistive elements 3, which are aligned in the longitudinal direction of the detecting surface of the magnetic sensor 1 so that the magnetic patterns 15 can be read.

When the magnetic card 6 moves in the direction indicated by an arrow a in FIG. 7 so as to approach the magnetic sensor 1 and passes over the detecting surface, each magnetoresistive element 3 of the magnetic sensor 1 magnetically senses each magnetic pattern 15 of the magnetic card 6 individually and outputs a detection output signal corresponding to the magnetic sensing. The detection output signals of the magnetic sensor 1 are applied to a processing circuit (not shown) for signal processing. Accordingly, the data recorded in the magnetic card 6 is processed.

The magnetic patterns 15 on the magnetic card 6 and the magnetoresistive elements 3 of the magnetic sensor 1 are aligned at predetermined intervals so that the data recorded in the magnetic card 6 in the form of the magnetic patterns 15 can be detected by the magnetic sensor 1.

In this configuration, when the interval between the adjacent magnetoresistive elements is large and when the alignment intervals of the magnetic patterns 15 of the magnetic card 6 vary, the correspondence between the magnetic patterns 15 and the magnetoresistive elements 3 of the magnetic sensor 1 is eliminated. As a result, the magnetic sensor 1 cannot accurately detect the magnetic patterns 15 on the magnetic card 6.

The applicant of the present application has proposed a magnetic sensor for reliably detecting each magnetic pattern even when the alignment intervals of the magnetic patterns vary. This magnetic sensor is disclosed in Japanese Unexamined Patent Application Publication No. 5-332703.

This magnetic sensor 1 includes a housing 2, as shown in FIG. 7. A long groove 20 is provided at approximately the center of the detecting surface of the housing 2. The long groove 20 extends in the longitudinal direction of the housing 2. Also, a plurality of the magnetoresistive elements 3 are aligned in the longitudinal direction of the groove 20 such that the magnetoresistive elements 3 contact each other.

At this time, by arranging the magnetoresistive elements 3 so that the gap between magnetic sensitive units 10 of the adjacent magnetoresistive elements 3 is shorter than the width of each of the magnetic patterns 15, the magnetic patterns 15 can be detected even when the alignment intervals of the magnetic patterns 15 of the magnetic card vary.

In order to improve the above-described magnetic sensor, the applicant of the present application has made further investigations and has discovered the following problems regarding the magnetic sensor.

As shown in FIG. 4, the magnetic sensitive unit 10 of each of the magnetoresistive elements 3 used in the magnetic sensor 1 includes a pair of magnetic sensitive portions 14a and 14b. Each of the magnetic sensitive portions 14a and 14b is formed by aligning a plurality of unit magnetic sensitive portions j in the horizontal direction such that the unit magnetic sensitive portions j are connected in series. The magnetic sensitive portions 14a and 14b are disposed on a substrate 19 with a predetermined gap therebetween.

However, as shown in FIG. 4, in each of the magnetoresistive elements 3, the regions between the two horizontal ends of the magnetic sensitive portion 10 and the two horizontal ends of the substrate 19 do not have a magnetic-sensing function and a magnetic-electric converting function. These regions are referred to as magnetically insensitive regions L, which cannot detect the magnetic patterns 15.

Accordingly, when the magnetoresistive elements 3 are aligned in the horizontal direction as in the above-described magnetic sensor, the magnetically insensitive regions L (for example, about 125 $\mu$m) of each magnetoresistive element 3 are combined with the magnetically insensitive regions L of the adjacent magnetoresistive elements 3, and thus, a relatively large magnetically insensitive region H is formed (see FIG. 7).

On the other hand, when the alignment intervals between the magnetic patterns 15 on the magnetic card 6 or the positional relationship of the magnetic patterns 15 and the magnetoresistive elements 3 varies, the position of each of the magnetic patterns 15 may be moved from the position indicated by the solid line which corresponds to the magnetic sensitive unit 10, to the position indicated by the broken line, which does not correspond to the magnetic sensitive unit 10, as shown in FIG. 7. As a result, the detection output of the magnetic pattern by the magnetic sensor 1 is decreased and thus the detection sensitivity may be decreased.

Also, in this magnetic sensor, the magnetoresistive elements are aligned along one line in the longitudinal direction of the detecting surface. Therefore, when the magnetic pattern approaches the magnetoresistive elements so as to cover the region between adjacent magnetoresistive elements, this causes crosstalk, that is to say, the detection output for the same magnetic pattern is simultaneously supplied from two magnetoresistive elements to a magnetic card data processing circuit. Consequently, a problem occurs when the processing of the data recorded in the magnetic card is performed in the processing circuit.

SUMMARY OF THE INVENTION

Accordingly, in order to overcome the problems described above, preferred embodiments of the present invention provide a magnetic sensor in which the whole region to be detected can be read magnetically, the sensitivity for detecting magnetic patterns is greatly increased even when the alignment of the magnetic patterns varies, and crosstalk is reliably prevented.

A magnetic sensor of a preferred embodiment of the present invention includes a plurality of rows of a plurality of magnetoresistive elements, in each of which the plurality of magnetoresistive elements are aligned in a direction which intersects at a predetermined angle the passing direction of an object including magnetic patterns to be detected, the plurality of rows of magnetoresistive elements being staggered in the passing direction of the object to be detected. Each of the magnetoresistive elements includes a magnetic sensitive region, and each of the magnetoresistive elements in one of the rows of elements is aligned so that the magnetic sensitive region overlaps the magnetic sensitive region of the magnetoresistive element in another row in the passing direction of the object to be detected.

With this configuration, the magnetic sensitive region of each magnetoresistive element in one of the rows overlaps the magnetic sensitive region of each magnetoresistive element in another row in the passing direction of the object to be detected. Therefore, the whole region, passed by the object, in the alignment direction of the magnetoresistive elements, is a magnetic sensitive region. Accordingly, the magnetic patterns on the object can be detected even when the alignment intervals of the magnetic patterns vary, and thus the detection output and detection sensitivity are very high and are prevented from being decreased.

Also, since the rows of elements are staggered at a predetermined distance in the detection direction, crosstalk, that is, when the magnetoresistive elements in different rows simultaneously detect one object, is prevented. Accordingly, the magnetic patterns can be reliably detected.

Preferably, the plurality of rows of elements includes two rows of elements. The magnetic sensitive region of each of the magnetoresistive elements in one of the two rows of elements overlaps the magnetic sensitive region of each of the magnetoresistive elements in the other of the two rows of elements in the passing direction of the object to be detected.

With this arrangement, even when the alignment intervals of the magnetic patterns on the object to be detected vary, the magnetic patterns can be reliably detected. Furthermore, the configuration can be simplified and thus a compact magnetic sensor can be realized.

Preferably, the magnetic sensor of preferred embodiments of the present invention includes a housing. The housing is provided with a plurality of accommodating grooves for individually accommodating the plurality of magnetoresistive elements aligned in each of the rows, and each of the individual magnetoresistive elements is accommodated in each of the accommodating grooves.

The housing may be provided with a plurality of common accommodating grooves for accommodating the plurality of magnetoresistive elements aligned in each of the rows, and each of the rows including the plurality of magnetoresistive elements is accommodated in each of the common accommodating grooves. In this case, the number of common accommodating grooves may correspond to the number of the rows of elements.

The alignment direction of the magnetoresistive elements may intersect the passing direction of the object to be detected perpendicularly or substantially perpendicularly, or at some other suitable angle.

Other features, elements, characteristics and advantages of the present invention will become more apparent from the following detailed description of preferred embodiments thereof with reference to the attached drawings.

BRIEF DESCRIPTION OF THE DRAWINGS

FIG. 6 is a plan view of the critical portion of a magnetic sensor according to another preferred embodiment of the present invention; and FIG. 7 shows the relationship between a magnetic card and a known magnetic sensor.

DETAILED DESCRIPTION OF PREFERRED EMBODIMENTS

Hereinafter, the details of the present invention will be described based on preferred embodiments with reference to the drawings.

Figure 1:
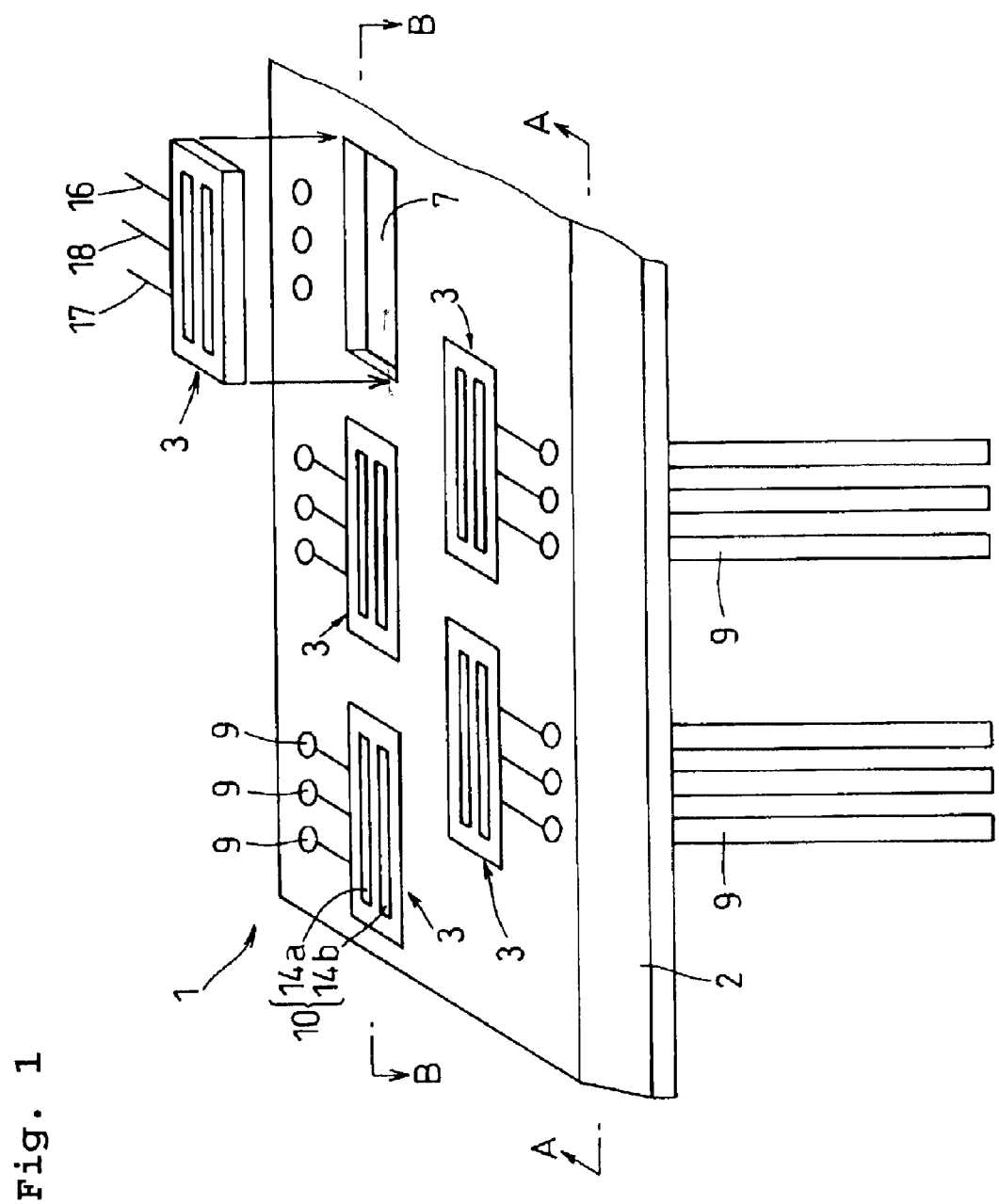
FIG. 1 is a perspective view of a magnetic sensor according to a preferred embodiment of the present invention.
Figure 2:
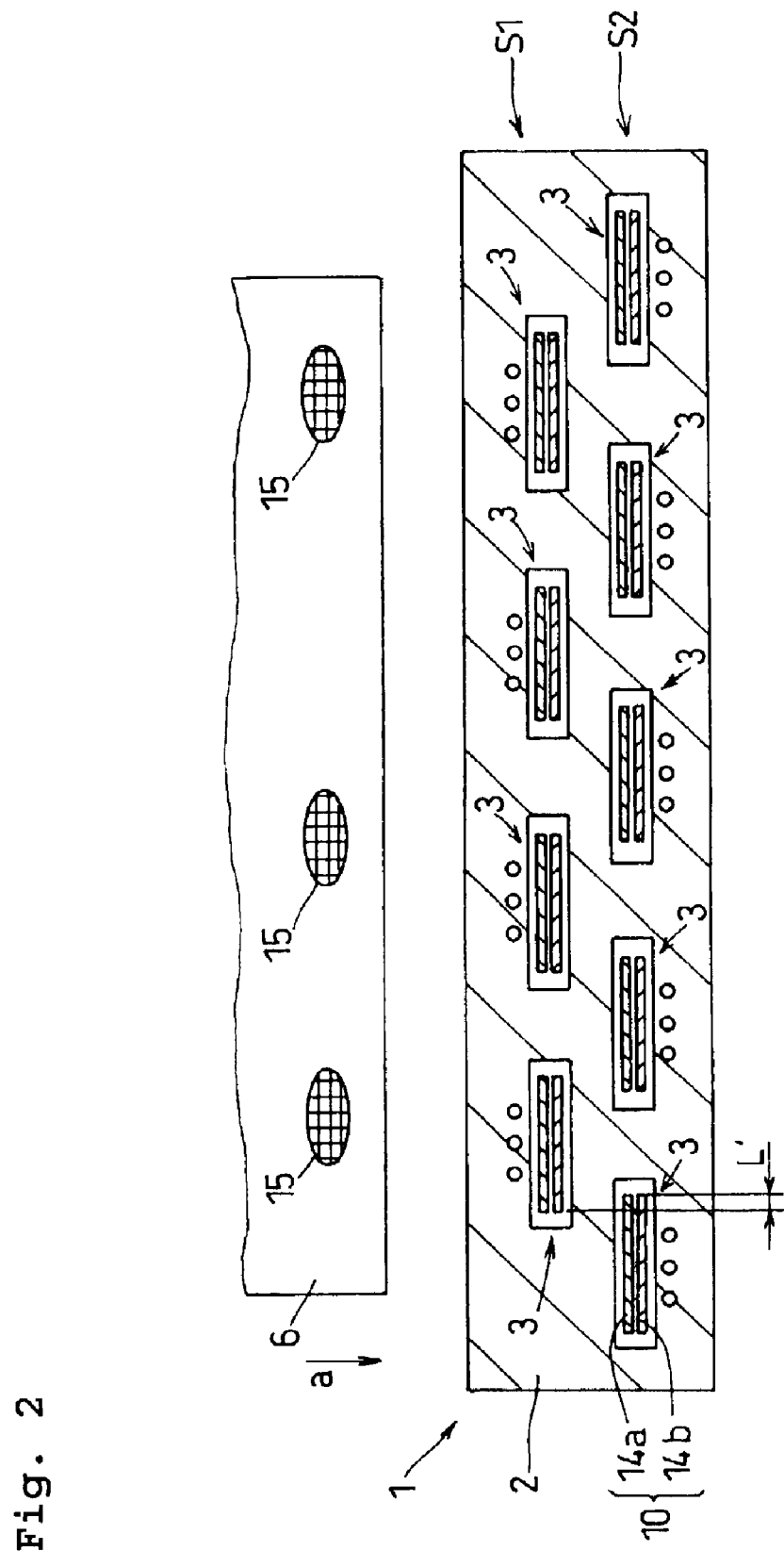
FIG. 2 is a sectional view taken along line A—A of FIG. 1.
Figure 3:
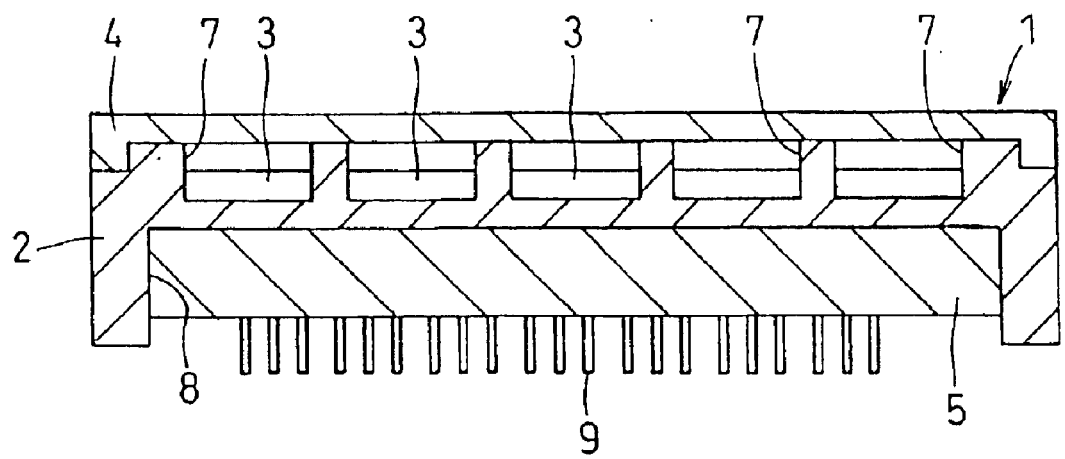
FIG. 3 is a sectional view taken along line B—B of FIG. 1.
Figure 4:
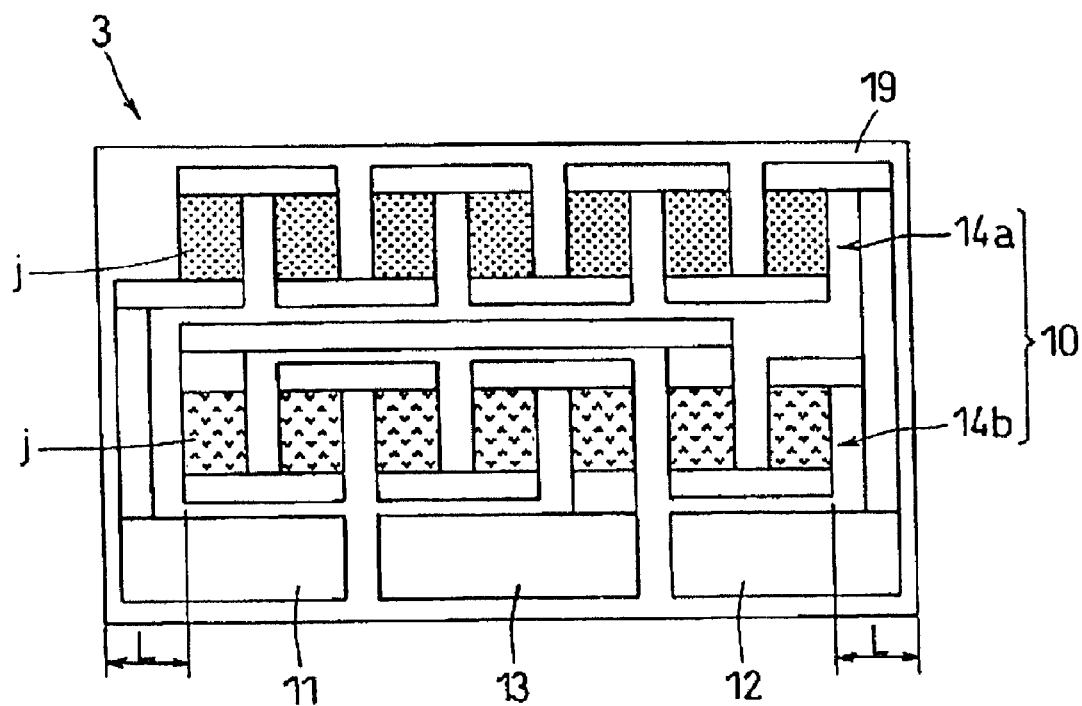
FIG. 4 is a plan view of a magnetoresistive element.

FIGS. 1 to 4 show a preferred embodiment of the present invention. FIG. 1 is a perspective view of a magnetic sensor according to this preferred embodiment, FIG. 2 is a sectional view taken along the line A—A of FIG. 1, FIG. 3 is a sectional view taken along the line B—B of FIG. 1, and FIG. 4 is a plan view of a magnetoresistive element.

In FIGS. 1 to 4, a magnetic sensor 1 of this preferred embodiment includes a substantially rectangular housing 2, a plurality of magnetoresistive elements 3, a metallic cover 4, and a permanent magnet 5 for biasing.

The housing 2 is long and extends in a direction (an alignment direction described later) that is preferably perpendicular to or substantially perpendicular to the direction in which a magnetic card 6, as an object to be detected, passes. A plurality of magnetoresistive-element-accommodating grooves 7 are provided in the upper major surface of the housing 2 so that each of the magnetoresistive elements 3 is accommodated and fixed in each of the magnetoresistive-element-accommodating grooves 7. The depth of each of the magnetoresistive-element-accommodating grooves 7 is preferably larger than the thickness of each of the magnetoresistive elements 3.

A permanent-magnet-accommodating groove 8 is provided in the lower major surface of the housing 2 so that the permanent magnet 5 is accommodated and fixed in the permanent-magnet-accommodating groove 8.

The upper major surface of the housing 2 is covered with the metallic cover 4. Further, a plurality of terminal pins 9 penetrate the housing 2 and are fixed therein.

As shown in FIG. 4, each of the magnetoresistive elements 3 includes a magnetic sensitive unit 10 provided therein. Further, terminals 11 and 13 for input/output are connected to the two ends of the magnetic sensitive unit 10, respectively, through connecting electrodes. Also, an intermediate terminal 12 is connected to an electrode for intermediately connecting the connecting electrodes. The three terminals 11, 12, and 13 are positioned at one side in the detecting direction of each of the magnetoresistive elements 3.

More specifically, as shown in FIG. 4, the magnetic sensitive unit 10 is preferably formed by providing a pair of magnetic sensitive portions 14a and 14b facing each other. The terminals 11 and 12 are connected to the two ends of the magnetic sensitive portion 14a, respectively, the terminal 13 is connected to one end of the magnetic sensitive portion 14b, and the terminal 12 is connected to the other end of the magnetic sensitive portion 14b.

Lead terminals 16, 17, and 18 are connected to the terminals 11, 12 and 13, respectively, and are connected to the terminal pins 9 provided in the housing 2.

Accordingly, in the magnetic sensor 1, each of the plurality of magnetoresistive elements 3 can detect magnetic information on the magnetic card 6, which defines an object to be detected.

In the above-described configuration, this preferred embodiment is characterized by the following points. In this preferred embodiment, the magnetoresistive-element-accommodating grooves 7 are preferably arranged in a zigzag pattern. That is, the accommodating grooves 7 are aligned, with predetermined intervals, preferably in two rows in a staggered configuration in the direction that is substantially perpendicular to the direction in which the magnetic card 6 passes over the magnetic sensor 1. Further, the magnetoresistive-element-accommodating grooves 7 in each row are arranged so that the magnetic card 6 overlaps the magnetic sensor 1 in the following manner when the magnetic card 6 passes over the magnetic sensor 1.

As shown in FIGS. 1 and 2, each of the magnetoresistive elements 3 is accommodated in one of the magnetoresistive-element-accommodating grooves 7 of each row of elements. The magnetoresistive elements 3 are aligned in two rows of elements S1 and S2, each of rows S1 and S2 includes a predetermined number of magnetoresistive elements 3. Further, the magnetic sensitive units 10 of two of the magnetoresistive elements 3 in row S1 overlap the magnetic sensitive unit 10 of one of the magnetoresistive elements 3 in row S2, when viewed in the direction in which the magnetic card 6 passes over the magnetic sensor 1 (the direction indicated by arrow a in FIG. 2) so that the magnetic patterns 15 are detected.

As shown in FIG. 4, in each of the magnetoresistive elements 3, the magnetic sensitive unit 10 is formed on a substrate 19 in a predetermined direction. Also, regions which are formed between the two ends in the predetermined direction of the substrate 19 and the two longitudinal ends of the magnetic sensitive unit 10 are magnetically-insensitive regions L. Further, the distance between the magnetic sensitive units 10 of adjacent magnetoresistive elements 3 provided in a predetermined direction in each row is preferably the same or shorter than the length of the detected portion of the magnetic card 6, which is the object to be detected (the length of the portion provided with the magnetic patterns 15). Herein, the magnetic sensitive unit 10 is a magnetic sensitive region.

Further, the magnetic sensitive units 10 of two magnetoresistive elements 3 in row S1 overlap the magnetic sensitive unit 10 of one magnetoresistive element 3 in row S2, when viewed in the direction in which the magnetic card 6 passes over the magnetic sensor 1.

As described above, in the magnetic sensor 1 according to this preferred embodiment, the plurality of magnetoresistive elements 3 are arranged in a predetermined direction such that they are adjacent to each other. Further, the magnetic sensitive units 10 of two magnetoresistive elements 3 in row S1 overlap the magnetic sensitive unit 10 of one magnetoresistive element 3 in row S2, when viewed in the direction in which the magnetic card 6 passes over the magnetic sensor 1. Thus, even though a large magnetically insensitive region is formed in the predetermined direction due to the magnetically insensitive regions, when the alignment intervals of the magnetic patterns 15 on the magnetic card 6 vary, the magnetic patterns 15 can be reliably and accurately detected because the whole longitudinal range on the magnetic card 6 provided with the magnetic patterns 15 can be detected. In particular, even when a region L' in which the magnetic sensitive units 10 in rows S1 and S2 overlap is on the magnetic pattern, the detection output and detection sensitivity do not decrease.

Further, rows S1 and S2 are provided with a predetermined space therebetween in the direction in which the magnetic card 6 passes. Accordingly, crosstalk, that is, when the magnetoresistive elements 3 in rows S1 and S2 simultaneously detect one object, is prevented, and thus the magnetic patterns 15 are reliably detected.

The present invention is not limited to the above-described preferred embodiments, and various applications and modifications are possible.

Figure 5:
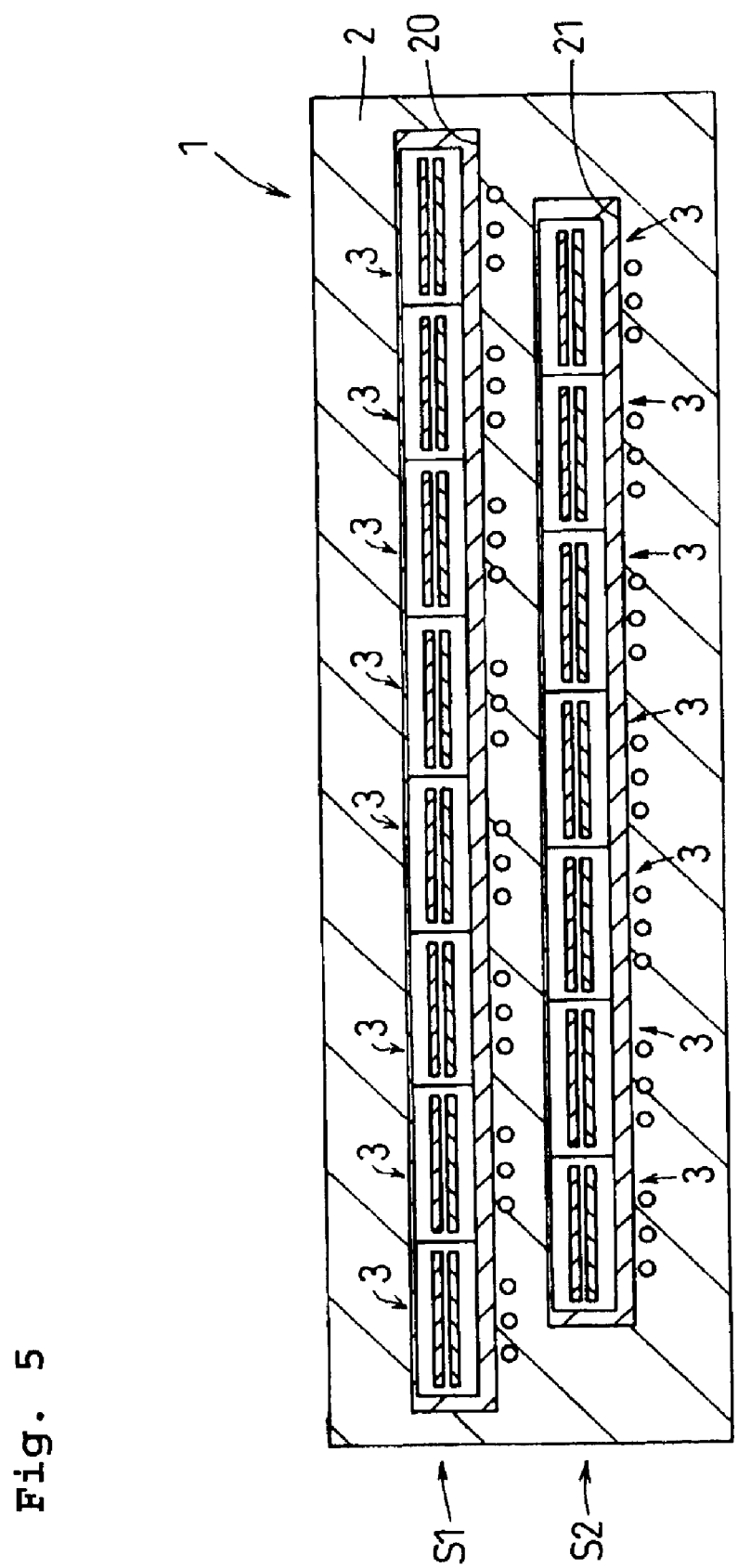
FIG. 5 is a plan view of the critical portion of a magnetic sensor according to another preferred embodiment of the present invention.

In the above-described preferred embodiments, each magnetoresistive-element-accommodating groove accommodates one magnetoresistive element. However, as shown in FIG. 5, common accommodating grooves 20 and 21 may be provided such that they are staggered by a predetermined length in the longitudinal direction, and the magnetoresistive elements 3 in rows S1 and S2 may be accommodated in the common accommodating grooves 20 and 21, respectively. In this case, the adjacent magnetoresistive elements 3 of rows S1 and S2 contact each other without a spacer therebetween. Also, the common accommodating grooves 20 and 21 are staggered by the predetermined length in the longitudinal direction. Therefore, when an object to be detected moves in the direction indicated by the arrow a so as to pass over the magnetic sensor 1 for magnetic detection, the magnetic sensitive unit 10, defining the magnetic sensitive region, of the magnetoresistive element 3 of row S1 overlaps the magnetic sensitive unit 10, defining the magnetic sensitive region, of the magnetoresistive element 3 of row S2 in the passing direction. Thus, the whole region passed by the object to be detected can magnetically detect the object in the direction in which the magnetoresistive elements 3 are aligned, and thus accurate magnetic detection can be realized.

In the above-described preferred embodiments, the housing of the magnetic sensor is relatively long. However, the housing is not necessarily long, as long as the housing is long enough to accommodate the magnetoresistive elements.

In the above-described preferred embodiments, the magnetoresistive elements are aligned in the direction that is substantially perpendicular to the direction in which an object to be detected passes, and define the rows of elements. However, the alignment direction is not necessarily perpendicular to the direction in which the object passes, and the rows of elements may intersect the passing direction at a predetermined angle, that is, the rows of elements may extend in a slanting direction.

In the above-described preferred embodiments, each magnetoresistive-element-accommodating groove accommodates one magnetoresistive element. However, each accommodating groove need not necessarily accommodate one magnetoresistive element. For example, as shown in FIG. 6, an accommodating groove 22 may accommodate a plurality of the magnetoresistive elements 3. In this case, a spacer is provided between rows S1 and S2, and between the adjacent magnetoresistive elements 3 in each row.

In the above-described preferred embodiments, the magnetic sensitive unit 10 of each of the magnetoresistive elements 3 used in the magnetic sensor 1 is preferably constructed by aligning a plurality of unit magnetic sensitive portions j in the horizontal direction, the unit magnetic sensitive portions j being connected in series, so as to define the magnetic sensitive portions 14a and 14b, as shown in FIG. 4. Further, the paired magnetic sensitive portions 14a and 14b are provided on the substrate 19 with a predetermined space therebetween. However, the magnetic sensitive portions 14a and 14b may be aligned horizontally such that they are connected to each other.

In the above-described preferred embodiments, a magnetic card is preferably an object to be detected. However, the object to be detected is not limited to a magnetic card, and a stick-type magnetic recording medium or any other suitable recording medium may be also used.

In the above-described preferred embodiments, the distance between the magnetic sensitive units of the adjacent magnetoresistive elements in each row extending in a predetermined direction is preferably the same as or shorter than the length of the detection area of the magnetic card 6, which is the object to be detected. However, the distance between the magnetic sensitive units may be longer than the detection area of the object to be detected.

As described above, according to preferred embodiments of the present invention, the whole detection area can be accurately detected. Thus, even when the alignment of the magnetic patterns varies, the sensitivity for detecting the magnetic patterns is greatly increased and the whole detection area is magnetically read. Furthermore, crosstalk is reliably prevented.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A magnetic sensor comprising:
   a plurality of rows including a plurality of magnetoresistive elements, in each of the plurality of rows the plurality of magnetoresistive elements are aligned in a direction which intersects at a predetermined angle a passing direction of an object including magnetic patterns to be detected, said plurality of rows of the magnetoresistive elements being staggered in the passing direction of the object to be detected;
   wherein each of the magnetoresistive elements includes a magnetic sensitive region, and each of the magnetoresistive elements in one of the rows of elements is aligned so that the magnetic sensitive region overlaps the magnetic sensitive region of the magnetoresistive element in another row in the passing direction of the object to be detected such that there is no space between each of the magnetic sensitive regions of said one of the rows of elements and an adjacent magnetic sensitive region of the magnetoresistive element in said another row in the passing direction of the object to be detected.

2. The magnetic sensor according to claim 1, wherein the plurality of rows of elements include two rows of elements, and the magnetic sensitive region of each of the magnetoresistive elements in one of the two rows of elements overlaps the magnetic sensitive region of each of the magnetoresistive elements in the other of the two rows of elements in the passing direction of the object to be detected.

3. The magnetic sensor according to claim 1, further comprising a housing, wherein the housing is provided with a plurality of accommodating grooves for individually accommodating the plurality of magnetoresistive elements aligned in each of the rows, and each of the individual magnetoresistive elements is accommodated in each of the accommodating grooves.

4. The magnetic sensor according to claim 3, wherein the housing is substantially rectangular and includes a metallic cover disposed thereon.

5. The magnetic sensor according to claim 3, wherein a depth of each of the grooves is larger than the thickness of each of the magnetoresistive elements.

6. The magnetic sensor according to claim 3, wherein the housing includes a permanent-magnet-accommodating groove and a permanent magnet accommodated and fixed in the permanent-magnet-accommodating groove.

7. The magnetic sensor according to claim 3, wherein the grooves are arranged in a zigzag pattern.

8. The magnetic sensor according to claim 1, further comprising a housing, wherein the housing is provided with a plurality of common accommodating grooves for accommodating the plurality of magnetoresistive elements aligned in each of the rows, and each of the rows including the plurality of magnetoresistive elements is accommodated in each of the common accommodating grooves.

9. The magnetic sensor according to claim 8, wherein the housing is substantially rectangular and includes a metallic cover disposed thereon.

10. The magnetic sensor according to claim 8, wherein a depth of each of the grooves is larger than the thickness of each of the magnetoresistive elements.

11. The magnetic sensor according to claim 8, wherein the housing includes a permanent-magnet-accommodating groove and a permanent magnet accommodated and fixed in the permanent-magnet-accommodating groove.

12. The magnetic sensor according to claim 8, wherein the grooves are arranged in a zigzag pattern.

13. The magnetic sensor according to claim 1, wherein the alignment direction of the magnetoresistive elements intersects the passing direction of the object to be detected perpendicularly.

14. The magnetic sensor according to claim 1, wherein the alignment direction of the magnetoresistive elements intersects the passing direction of the object to be detected substantially perpendicularly.

15. The magnetic sensor according to claim 1, wherein each of the magnetic sensitive regions includes a pair of magnetic sensitive portions.

16. The magnetic sensor according to claim 15, wherein the magnetic sensitive portions are arranged to be spaced from each other and facing each other.

17. The magnetic sensor according to claim 15, wherein the magnetic sensitive portions are aligned horizontally and are connected to each other.

18. The magnetic sensor according to claim 1, wherein the object to be detected is a magnetic card.

* * * * *